Figure 1:
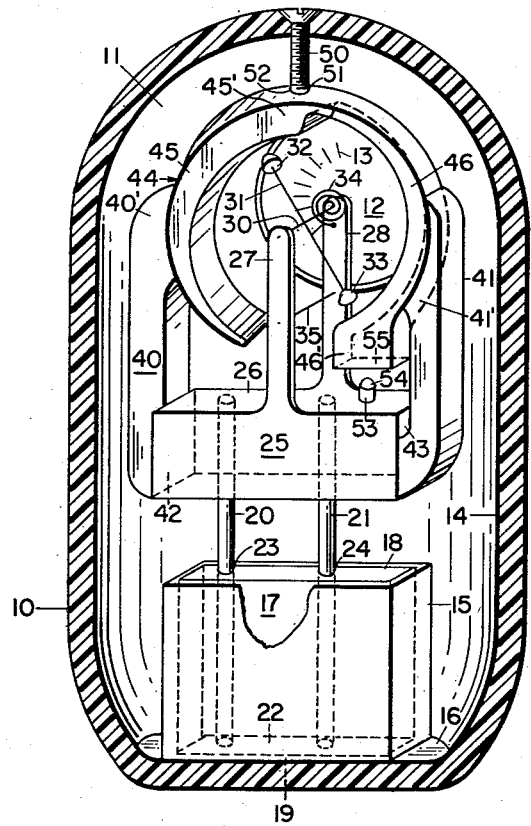

Nov. 4, 1958  H. E. HOLLMANN  2,859,354
RADIATION METER DEVICE
Filed Nov. 12, 1953

INVENTOR
HANS E. HOLLMANN

BY

ATTORNEYS

United States Patent Office 2,859,354
Patented Nov. 4, 1958

2,859,354

RADIATION METER DEVICE

Hans E. Hollmann, Oxnard, Calif.

Application November 12, 1953, Serial No. 391,773

9 Claims. (Cl. 250—83.6)

(Granted under Title 35, U. S. Code (1952), sec. 266)

The invention described herein may be manufactured and used by or for the Government of the United States of America for governmental purposes without the payment of any royalties thereon or therefor.

The present invention relates to a radiation meter device and more particularly to a radiation meter device utilizing electret means for charging the device.

The present invention concerns portable radiation meters adapted to be carried about by a person to measure radiation intensity and avoid overexposure. Since the development of atomic energy, the need has arisen for a simple and inexpensive meter which will provide scientists and technicians who work in the vicinity of radioactive substances with a quick and reliable indication of the amount of radiation to which they have been exposed during a given period of time. Furthermore, in the event of an atomic war, such meters will be required in large numbers for civilians and military personnel who may be exposed to radiation subsequent to the explosion of an atomic bomb or the like. As radiation meters for disaster use are needed in large numbers, they must be simple and inexpensive to manufacture, and since the meters will be used by persons unfamiliar with such devices, they must be rugged, easy to use, and reliable in operation. In case of an atomic disaster, there is also the possibility that no batteries will be available and that there will be a failure of electric power, and it is therefore desirable that such meters be self-contained, requiring no external source of power. The maintenance required for the meters should also be kept to a minimum, avoiding the use of batteries or other sources of power which must be replaced from time to time, if possible.

Prior art radiation meters have proved disadvantageous for a variety of reasons. Such devices are complicated and expensive in construction, and unskilled personnel have difficulty in operating them. Known devices which require no external source of power employ some means of producing an electrostatic charge such as highly polished beads in a metal container or a miniature influence machine. Such electrostatic generator sources for producing the charge in the devices are unsatisfactory since wear and tear on the parts often prevents the generation of a sufficient charge to operate the meter. In addition, it is very difficult and time consuming to develop the same potential between the electrodes of such devices each time they are charged. Since radiation meters are calibrated for a certain initial potential existing between the electrodes thereof, readings obtained from the meters will be inaccurate when the initial potential between the electrodes is not of the proper magnitude.

The invention device utilizes an arrangement which is simple and inexpensive in construction, and it may be quickly and easily used by unskilled personnel. An electret means which is suitably mounted in the device is utilized to charge the electrodes thereof, and therefore no external source of power is required. The electret produces a substantially constant electrical potential between the electrodes of the device each time it is employed for charging, and consequently, accurate and reliable readings are obtained.

An object of the present invention is the provision of a new and novel radiation meter device which may be dependably used by persons unfamiliar with such devices.

Another object is to provide a new and novel radiation meter device which is self-contained, requiring no external source of power.

A further object of the invention is the provision of a new and novel radiation meter device which is simple and inexpensive in construction, yet rugged and reliable in operation.

Figure 2:
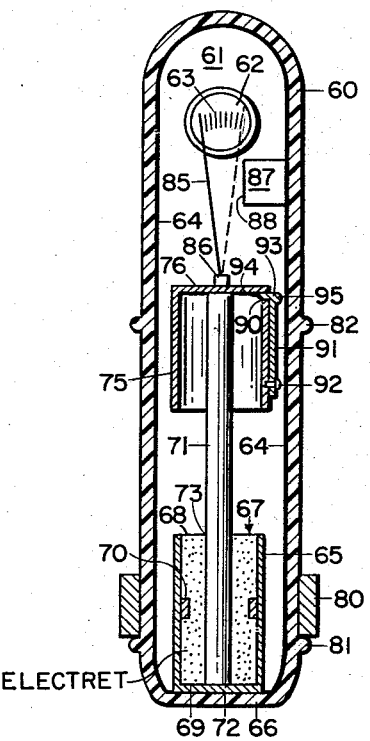

Other objects and many of the attendant advantages of this invention will be readily appreciated as the same becomes better understood by reference to the following detailed description when considered in connection with the accompanying drawings wherein:

Fig. 1 is an isometric view of a preferred embodiment of the device with a portion of the housing cut away, and Fig. 2 is a longitudinal section view of a modification of the device.

As used herein, the term electret is intended to denote a member which is composed at least partially of a dielectric substance in which a permanent state of electrostatic polarization has been set up. A member composed of such a substance will exhibit a substantially constant electrical charge indefinitely without apparent diminution. Suitable dielectric substances may be composed for example of thermoplastics, glass, alkaline earth titanates and the like, or of mixtures such as 50% Carnauba wax and 50% hydrogenated rosin. The manufacture and composition of electrets are well-known in the art, and it should be understood that any member exhibiting a permanent state of electrostatic polarization may be utilized in the present invention.

Referring now to the drawing, there is shown in Fig. 1 a hollow housing or body member 10 with the front half cut away for illustration, the housing being generally elliptical in cross-sectional configuration and having an enclosed chamber or cavity 11 formed therein. The housing is composed of an electrically nonconductive material which freely passes radioactive radiation such as synthetic resins, plastics or the like. The housing is hermetically sealed, a gas such as air being disposed in chamber 11, and a suitable desiccant such as lime or the like may also be disposed within the chamber. A transparent window 12 formed of glass or the like and having indicia 13 scribed thereon is mounted in a lateral portion of member 10, and a similar window (not shown), is mounted diametrically opposite window 12 in that lateral portion of housing 10 which has been cut away. Window 12 may be a magnifying lens to facilitate the reading of deflections of the indicating means of the device relative to indicia 13. Indicia 13 are suitably spaced from one another to provide a calibrated scale such that correct readings may be obtained therewith.

A thin layer of electrically conductive material 14 is secured to the inner surface of housing 10, and may comprise, for instance, tin foil which may be glued to housing 10, or a thin copper coating which may be sprayed on the inner periphery of the housing. Layer 14 provides a "Faraday cage" which prevents external electrical fields from affecting the operation of the device and at the same time allows radiations to penetrate into chamber 11.

A box-like storage container 15 is secured to a flattened end portion 16 on the inner periphery of the housing and has a cavity formed therein, the top of the container being open. An electret member 17 is normally disposed within the container in the position shown in the drawing, and it should be noted that container 15 is electrically connected to layer 14 which is also disposed on end portion 16 of the housing. Member 17 is generally rectangular in configuration and fits snugly within the cavity formed in the storage container, the lengthwise dimensions of the storage container and the electret being parallel with the transverse axis of an elliptical cross-section of housing 10. Container 15 is preferably formed of a substance such as lead which is impervious to radioactive radiation in order to protect the electret from radiation, and the interior of the container is preferably provided with a lining of steel wool or numerous contact springs adapted to contact the electret to provide a short-circuit along the surfaces of the electret. When the surfaces of the electret are thus short-circuited, the container serves as a "keeper" which serves to preserve the electrification of the electret in a manner similar to that wherein a piece of iron placed between the poles of a permanent magnet serves to preserve the magnetism thereof.

Two guide rods 20 and 21 formed of electrically nonconductive material such as ceramics or the like extend downwardly through the open end of container 15, the lower ends of the rods being secured to the inner periphery of the lower surface 22 of the container. Rods 20 and 21 pass through two complementary passages 23 and 24 respectively which extend longitudinally through the electret whereby when the device is inverted, the electret is adapted to slide axially with respect to the guide rods. The rods extend upwardly through the open lower end of a hollow charging container 25, and the upper ends of the rods are secured to the lower surface of the upper wall 26 of the charging container.

Container 25 is formed of a suitable electrically conductive material such as copper, iron or the like, and two arms 27 and 28 are formed integral therewith, extending upwardly from opposite lateral portions of the container. A metallic spindle 30 is journaled at its opposite ends in the outer end portions of arms 27 and 28, and a metallic needle 31 is fixed at the mid-point thereof to the spindle such that the needle and spindle rotate as a unit. The needle has enlarged end portions 32 and 33 formed of electrically conductive material such as copper, iron or the like, and a small coil spring 34 is fixed at one end to arm 28 and at its other end to spindle 30 whereby the spindle and needle are urged in a counter-clockwise direction as viewed in the drawing. A small bar 35 is secured at its opposite ends to arms 27 and 28, the bar serving as a stop means which is adapted to be engaged by the needle and thereby limit the rotational movement of the needle.

Two support members 40 and 41 formed of electrically nonconductive material are respectively secured to the outer peripheries of opposite end walls 42 and 43 of container 25, the end portions 40' and 41' of members 40 and 41 respectively being connected to diametrically opposite portions of a ring electrode 44 whereby the ring 44 is electrically insulated from container 25. The outer periphery of member 44 is symmetrical and concentric with the axis of spindle 30; however, the inner peripheries of the two halves 45 and 46 of the ring are eccentric with respect to the axis of spindle 30. The thickness of left half 45 of ring 44 increases from the lower to the upper portion 45' thereof, while the thickness of the right half 46 of the ring increases correspondingly from the upper to the lower portion 46' thereof. It is thus seen that the upper portion of ring segment 45 and the lower portion of ring segment 46 lie closest to the circular arcs defined by the enlarged end portions 32 and 33, respectively, of needle 31 on rotation thereof.

Needle 31 and end portions 32, 33 comprise one electrode of the device and ring 44 comprises the other electrode thereof, it being apparent that upon charging the electrodes with charges of different polarity, needle 31 will be rotated in a clockwise direction against the force of spring 34 from its starting position where end portions 32 and 33 of the needle are adjacent the thin portions of ring segments 45 and 46, respectively, into the position shown in the drawing, where such end portions of needle 31 are adjacent the thick portions 45' and 46', respectively, of ring 44.

A bolt 50 is threaded through an opening in housing 10 and sealed in place, the lower rounded end 51 of the bolt being seated in a similarly rounded depression 52 formed in the upper surface of ring 44. In this manner, the ring is supported in fixed relation to the housing and is electrically connected to layer 14.

It should be noted that container 25 is normally completely insulated from container 15 and ring 44; however, means is provided for selectively electrically connecting container 25 to ring 44 and container 15. A small hollow metallic tube 53 is secured to the upper surface of wall 26 of container 25, and a cylindrically-shaped metallic pin or contact 54 is slidably fitted within a complementarily shaped cavity formed in the tube. The upper end of the tube is open whereby pin 54 is adapted to slide out of the tube and engage the lower surface 55 of the ring adjacent thereto when the device is inverted from the position shown in the drawing.

The operation of the device shown in Fig. 1 is as follows:

The housing is normally held in the position shown in the drawing with electret 17 disposed within storage container 15 and pin 54 positioned within tube 53 so as to be out of engagement with ring 44. When the device is completely discharged, needle 31 is urged into engagement with bar 35 under the influence of spring 34. When it is desired to charge the device, housing 10 is inverted and electret 17 slides along rods 20 and 21 until the upper surface 18 of the electret engages the lower surface of wall 26 on container 25. At the same time, pin 54 slides partially out of tube 53 and engages the lower surface 55 of ring 44 thereby electrically connecting container 25 to ring 44 and to container 15 through the intermediary of bolt 50 and layer 14.

Assuming that the upper surface 18 of the electret is positively charged and that the lower surface 19 thereof is correspondingly negatively charged, when the electret is disposed within container 25, the positive charges on surface 18 attract negative charges to the lower surface of wall 26 and the positive charges on the container are repelled through pin 54 to ring 44, bolt 50, layer 14 and container 15. The housing is then inverted to its original position as shown in the drawing, whereupon pin 54 disengages from surface 55 of ring 44 and slides back within tube 53, and electret 17 simultaneously slides back within container 15. Container 25, needle 31 and end portions 32, 33 are then negatively charged and ring 44 is positively charged whereby needle 31 is urged into the position shown in Fig. 1 due to the attraction between the oppositely charged needle and ring.

The meter is then ready for operation and the induced charge will remain on the device for a long period of time unless radiation causes it to discharge. As the meter is subjected to radiation, the gas within chamber 11 will ionize, causing the device to discharge whereupon the needle will be urged counterclockwise by spring 34 as the attraction between the electrodes weakens. It is evident that the meter will measure the total radiation to which it has been exposed, and therefore by observing the movement of needle 31 relative to indicia 13, a person is enabled to determine the amount of radiation he has been subjected to. By observing the movement of needle 31 during a given time interval, the rate of radiation absorption may also be determined. When the device has been discharged, it is merely necessary to again invert housing 10 such that electret 17 is disposed within container 25 and then return the housing to its original position whereby the electret will return the container 15 and the device will be recharged and ready for operation.

Referring now to Fig. 2, there is shown a modification of the device including a hollow housing 60 approximately the size of a conventional fountain pen and formed of the same material as housing 10 in Fig. 1, the housing being hermetically sealed and having a gas such as air and a suitable desiccant disposed within an enclosed chamber or cavity 61 formed therein. A transparent window 62 formed of glass or the like and having suitable indicia 63 scribed thereon is mounted in a lateral portion of member 60, and a similar window (not shown), is mounted diametrically opposite window 62 in that lateral portion of housing 60 which has been cut away. As in the device shown in Fig. 1, window 62 may be a magnifying lens to facilitate the taking of readings with the device. A thin layer of metallic material 64 is secured to the inner periphery of housing 60 for the same purpose and in a manner similar to that in which layer 14 is disposed on the inner periphery of housing 10 in Fig. 1.

A cylindrical storage container 65 is secured to flattened end portion 66 on the inner periphery of the housing and has a cavity formed therein, the top of the container being open, and an electret member 67 is normally disposed within the container in the position shown in the drawing. It should be noted that container 65 is electrically connected to layer 64 which is also disposed on end portion 66 of the housing. Member 67 is substantially cylindrical in configuration and fits snugly within the cavity formed in the storage container. Container 65 is preferably formed of lead or the like and provided with a lining of steel wool or numerous contact springs for the same purpose and in a manner similar to that of container 15 in Fig. 1.

Electret 67 is provided with a ring 70 formed of a suitable magnetic material such as iron or the like, the ring being disposed within a circumferential groove formed about the middle or neutral zone of the electret. A guide rod 71 formed of electrically non-conductive material such as synthetic resins or the like extends downwardly through the open end of container 65, the lower end of the rod being secured to the inner periphery of the lower surface 72 of the container. Rod 71 passes through a complementary passage 73 which extends longitudinally through the electret, and extends upwardly through the open end of a cylindrical charging container 75, the upper end of the rod being secured to the lower surface of the upper wall 76 of the charging container.

A ring-shaped permanent magnet 80 formed of Alnico or the like has a sliding fit with the outer periphery of housing 60, sufficient friction being provided between the magnet and the housing to prevent inadvertent movement of the magnet except when manually actuated. Magnet 80 attracts ring 70, and therefore, movement of the magnet along the outer periphery of the housing causes a corresponding movement of the electret along guide rod 71 within cavity 61. A first peripheral flange 81 formed integral with the outer periphery of housing 60 limits the movement of the magnet in a downward direction, and a second peripheral flange 82 formed integral with the outer periphery of housing 60 limits the movement of the magnet in an upward direction to prevent damage to the components of the device. Whereas in the device shown in Fig. 1, the possibility exists that the device may be accidentally inverted or jarred causing the electret to be positioned within the charging container before the device is completely discharged, it is apparent that the permanent magnet in the device shown in Fig. 2 prevents such accidental displacement of the electret.

Container 75, which is spaced from the inner periphery of the housing, is formed of a suitable electrically conductive material such as copper, iron or the like and a thin elongated flexible electrode 85 formed of similar material is mounted at its lower end in a centrally located extension 86 formed integral with wall 76. Member 85 is so mounted in extension 86 that it is normally disposed in the position shown in Fig. 2 when the device is not charged.

An electrode 87 formed of an electrically conductive material similar to that of member 85 is secured to the inner periphery of housing 60 and is in contact with layer 64, member 87 having a knife edge 88 formed on a lateral portion thereof.

It should be noted that container 75 is normally completely electrically insulated from container 65 and electrode 87; however, means is provided for selectively electrically connecting container 75 to electrode 87 and container 65. An opening 90 is provided in a lateral portion of container 75, and a resilient leaf-spring member or contact 91 formed of a material similar to that of the container is secured at one end thereof to the outer periphery of the container by a small stud 92. An arm 93 extends perpendicularly from the opposite end of member 91 and passes through opening 90, the outer end of arm 93 being formed as a sloping cam surface 94. The natural resiliency of member 91 normally urges it into the position shown in Fig. 2; however, it is apparent that when electret 67 is moved into container 75, the outer periphery of the upper surface 68 of the electret will engage cam surface 94 and urge arm 93 outwardly until rounded portion 95 thereof engages layer 64.

The operation of the device shown in Fig. 2 is as follows:

The housing is normally held in the position shown in the drawing with electret 67 disposed within storage container 65, and contact 91 is positioned such that portion 95 is out of contact with layer 64. When the device is completely discharged, electrode 85 is positioned as shown at its maximum distance away from knife edge 88. When it is desired to charge the device, ring 80 is manually grasped and moved upwardly until it engages flange 82, moving electret 67 from container 65 into container 75 and camming contact 91 outwardly until portion 95 engages layer 64 thereby electrically connecting container 75 to electrode 87 and container 65 through the intermediary of contact 91 and layer 64. Ring 80 is then manually returned to its original position, moving electret 67 back into container 65 and allowing portion 95 to disengage from layer 64.

Assuming that the upper surface 68 of the electret is positively charged and that the lower surface 69 thereof is negatively charged, container 75 and electrode 85 are then negatively charged and electrode 87 is positively charged in a manner similar to the charging of the electrodes of the device shown in Fig. 1 whereby electrode 85 is attracted toward knife edge 88 and is positioned as shown in dotted lines on the drawing. The meter is then ready for operation, and as it is subjected to radiation, the device discharges whereupon electrode 85 is urged to the left due to its natural resilience.

A substantially constant potential is developed between the electrodes of the devices shown in Figs. 1 and 2 due to the fact that the charge depends on the electrostatic polarization of the electret which remains substantially constant for indefinite periods of time. Although the configurations shown for the housing, containers and electrets are considered to be preferable, various other configurations may be utilized if desired.

It is apparent from the foregoing that there is provided a new and novel radiation meter device which may be dependably used by unskilled personnel and that the device is self-contained, requiring no external source of power. The device is simple and inexpensive in construction, yet rugged and reliable in operation.

Obviously many modifications and variations of the present invention are possible in the light of the above teachings. It is therefore to be understood that within the scope of the appended claims the invention may be practiced otherwise than as specifically described.

I claim:
1. A radiation meter device which comprises a hollow housing formed of electrically nonconductive material and having an enclosed chamber formed therein, a thin layer of metallic material disposed on the inner periphery of said housing, said housing being adapted to freely pass radiation, means mounted in said housing for viewing the interior thereof, a first electrode supported within said chamber in fixed relation to said housing, a second electrode movably mounted within said chamber adjacent said first electrode, an electret movably disposed within said chamber whereby said electret may be selectively actuated to create an electric potential between said electrodes, and means for shielding said electret prior to selective actuation thereof from the radiation passing through said housing.

2. A device as defined in claim 1 including a charging member electrically connected to one of said electrodes, a storage container for said electret means normally electrically insulated from said charging member, and means for selectively electrically connecting said charging member to the other of said electrodes.

3. A device as defined in claim 1 including a charging member electrically connected to one of said electrodes, a storage container for said electret means normally electrically insulated from said charging member, means for selectively electrically connecting said charging member to the other of said electrodes, said charging member being in the form of a container adapted to receive said electret means to create an electric potential between said electrodes, said storage container being substantially impervious to radioactive radiations, and means mounted on the inner periphery of said storage container for providing a short-circuit along the surface of said electret means.

4. A radiation meter device which comprises a hollow housing having an enclosed chamber formed therein, a thin layer of metallic material disposed on the inner periphery of said housing, a first electrode comprising an eccentric ring member supported within said chamber and electrically connected to said layer, a second electrode comprising a needle pivotally supported by a charging container disposed within said chamber, resilient means urging said needle toward a stop member, said second electrode and said charging container being normally electrically insulated from said first electrode, a storage container impervious to radioactive radiation disposed within said chamber and normally electrically insulated from said charging container, electret means normally positioned within said storage container and adapted to be selectively positioned within said charging container, and means for selectively electrically connecting said charging container to said first electrode and said storage container.

5. A device as defined in claim 4 wherein said last-mentioned means for selectively electrically connecting said charging container to said first electrode and said storage container includes a movable contact supported by said charging container and adapted to move into engagement with said first electrode when said electret means is moved from said storage container into said charging container.

6. A device as defined in claim 4 including means for guiding the movement of said electret means.

7. A radiation meter device which comprises a hollow housing having an enclosed chamber formed therein, a thin layer of metallic material disposed on the inner periphery of said housing, a first knife-edged electrode supported within said chamber and electrically connected to said layer, a second electrode comprising an elongated flexible metallic member supported by a charging container disposed within said chamber, said second electrode being so mounted as to be normally spaced from said first electrode, said second electrode and said charging container being normally electrically insulated from said first electrode, a storage container normally electrically connected to said layer and electrically insulated from said charging container, electret means normally positioned within said storage container and adapted to be selectively positioned within said charging container, and means for selectively electrically connecting said charging container to said first electrode.

8. A device as defined in claim 7 wherein said last-mentioned means comprises a movable contact supported by a lateral portion of said charging container and normally biased away from said layer, said electret means being adapted to urge said movable contact into engagement with said layer when said electret means is moved into said charging container.

9. A device as defined in claim 12 including a metallic member secured to an intermediate portion of said electret means, and magnetic means slidably fitted about the outer periphery of said housing and adapted to move said metallic member and said electret means when said magnet is moved relative to said housing.

References Cited in the file of this patent

UNITED STATES PATENTS

| | | |
|---|---|---|
| 2,646,515 | Futterknecht | July 21, 1953 |
| 2,663,802 | Ohmart | Dec. 22, 1953 |
| 2,668,245 | Rich | Feb. 2, 1953 |
| 2,741,707 | Futterknecht | Apr. 10, 1956 |